Dec. 23, 1941.    C. F. ABRAHAM    2,266,945
SCREW CONVEYER DRIVE ASSEMBLY
Filed June 3, 1940
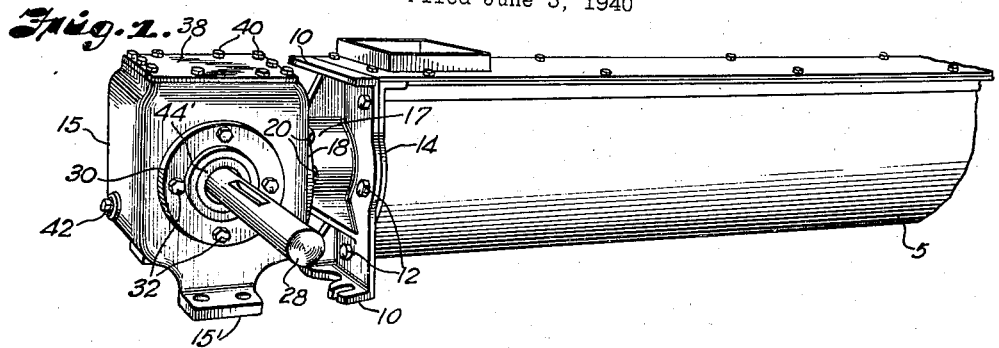
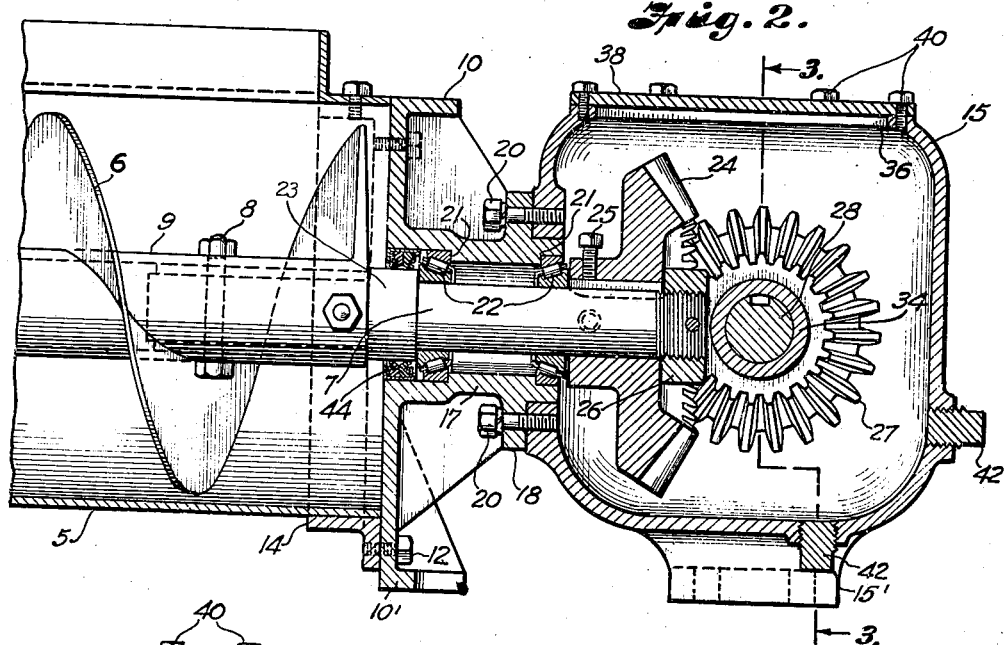
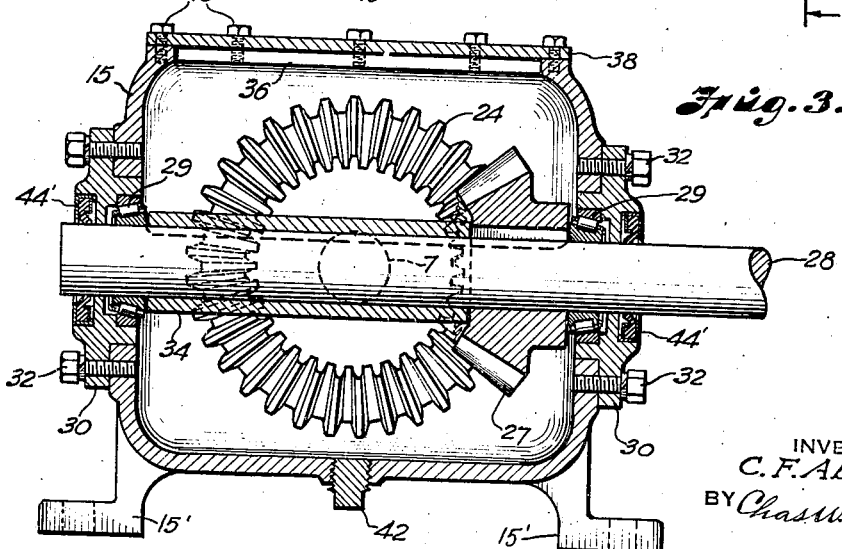
INVENTOR
C. F. Abraham,
BY Chas W Gerard
ATTORNEY Patented Dec. 23, 1941

2,266,945

UNITED STATES PATENT OFFICE 2,266,945

SCREW CONVEYER DRIVE ASSEMBLY

Clarence F. Abraham, Chicago, Ill., assignor to Screw Conveyor Corporation, Hammond, Ind., a corporation of Illinois Application June 3, 1940, Serial No. 338,531

2 Claims. (Cl. 198—213)

The present invention relates to improvements in the drive assemblies for screw conveyer apparatus, and the essential purpose of the invention is to provide a more efficient arrangement and enclosed type of construction for the connections from the countershaft drive to the conveyer, which will not only maintain an effective drive relation but also accommodate changes or adjustments in the installation with a minimum of difficulty or disturbance of the drive connections.

For accomplishing this purpose, separate units are provided for the countershaft and gear connections, and for the conveyer box end plate for the drive end to the conveyer, together with means for connecting and disconnecting said units as may be required. The gear case unit may thus be handled and any changes or adjustments made without disturbing the alinement of the conveyer, and is moreover constructed for maintaining an effective seal for lubricants.

The improved construction further embodies a design adapted to take up any end thrust of the shafts, including the connections to the drive end of the conveyer.

Having these general objects in view, the invention will now be described by reference to the accompanying drawing showing a construction adapted for embodying the proposed improvements, after which those features and combinations deemed to be novel and patentable will be particularly set forth and claimed.

In the drawing—

Figure 1 is a perspective view illustrating a construction embodying the present features of improvement;

Figure 2 is a longitudinal sectional view thereof, on a slightly larger scale; and Figure 3 is a cross-sectional view, representing a section taken on the line 3—3 of Figure 2.

Referring now to the drawing in detail, this illustrates a conventional type of conveyer box or housing 5 for the operation of a spiral or screw type of conveyer 6 driven in the usual manner by means of a drive end shaft or gudgeon 7 which is adapted to be coupled in any desired manner, as indicated at 8, to the axis or shaft 9 of the conveyer 6.

For making a drive connection between said conveyer and the usual countershaft drive, I provide an assembly made up of an end bearing unit 10 adapted for attachment (as by means of screws 12) to the saddle or flange structure 14 of the conveyer box or housing, and also a gear case unit 15 for the drive gearing and countershaft bearings. The units 10 and 15 are also formed with base-supporting portions 10' and 15', respectively, whereby said units may be positioned and anchored with the drive elements also accurately positioned in their properly alined drive relation, as hereinafter described.

The bearing unit 10 is constructed with a bearing sleeve or extension 17 formed with a flange 18 adapted to be secured by screws 20 to the side of the gear case unit 15, as clearly shown in Figure 2. This sleeve or extension 17 is also formed with suitable internal bearing seats 21 for the mounting of antifriction bearings such as Timken bearing assemblies 22, and in such a manner as to oppose end thrust in either direction of the drive end 7, the free end of which drive end also carries a bevel gear 24 keyed thereto and secured (as by set screws 25 and a clamp nut 26) in abutting relation to the adjacent bearing 22 (Figure 2).

For cooperating with said clamp nut 26 in securing and retaining the parts in this assembled relation the drive end 7 is provided with a hub or collar 23 in position to back up the outer bearing structure 22, as shown.

The gear 24 meshes with a bevel drive pinion 27 keyed to the countershaft 28, which in turn is journaled in antifriction bearings, such as Timken bearing assemblies 29, also arranged in counterthrust relation and accommodated in bearing plates 30 attached by screws 32 to opposite sides of the gear case 15 (see Figure 3). The pinion 27 is secured in abutting relation to one of said bearings 29, and a spacing sleeve 34 is mounted between said pinion and the other bearing assembly 29, as shown.

The top of the gear case 15 is open, as indicated at 36, and provided with a cap plate 38 removably secured by screws 40, whereby access may be had to the interior of the case, as hereinafter explained.

Removable plugs 42 are also provided for use in connection with the supply of a lubricant; and suitable lubricant closures or seals 44 and 44' are fitted outside the several bearing assemblies 22 and 29 as shown. The seal 44 is shown as of a duplex type adapted not only to prevent the escape of lubricant from the outer bearing 22 but also to prevent the passage of any material from the conveyer box or housing.

With such improved arrangement and construction, definite and material advantages are gained over prevailing types of screw conveyer drives. For in the present improved construction, separate and independent units are provided for the gear case and countershaft and for the drive end to the conveyer, which is an important and desirable feature from the standpoint not only of installation purposes but also as regards maintenance operations requiring changes and adjustments from time to time. For example, where manipulation of the gear unit is required, as for installing a longer countershaft to drive an additional conveyer unit therefrom, this can be accomplished with a minimum of disturbance of the connections by removal of the cover plate 38 and the gears to change the countershaft, and without in any way affecting the conveyer assembly since the gears can be removed from position and the gear case 15 detached from the unit 10 without any disturbance whatever of the drive end to the conveyer. This is in distinct contrast to the manipulation necessary for the servicing of conventional designs in which the gear housing and drive end bearing structure for the conveyer are constructed in a unit composed of horizontally instead of vertically divided sections and hence necessitate an opening up of the drive end bearing for effecting such changes in the drive connections and thus involve a possibility and likelihood of disturbing the conveyer alinement.

At the same time the improved construction preserves all the advantages of sealed bearing structures, using no lubricant other than that required for the gearing—which is of importance in many conveyer operations, such as those involving the handling of foodstuffs. Moreover, the type and arrangement of the bearings are adapted not only to reduce the power loss prevalent in many of the conventional designs but also to take up all end thrust in both of the shaft mountings.

It is to be noted further that the design of the improved construction is also of such a character as to eliminate excessive size proportions as well as excessive weight in the structural design, and that the same is equally well adapted for either the steel or wood type of conveyer boxes.

Having therefore illustrated and described what I regard as a practical and efficient arrangement and construction for fulfilling the desired objects of my improvements, I desire to reserve the right to make all such changes or modifications which may be deemed to fall fairly within the spirit and scope of the invention as defined by the appended claims.

What is claimed and desired to be secured by Letters Patent is:

1. A drive construction for screw conveyer apparatus comprising an end bearing unit having means for detachable connection with one end of a screw conveyer trough or housing and forming the end wall therefor, said unit being also formed with a base supporting portion and a sleeve bearing structure for the drive end to the conveyer, a gear case unit detachably connected with said first unit and comprising countershaft bearings and gearing for connection with said drive end and also formed with a base supporting portion cooperating with said first base supporting portion to support said drive elements in their properly alined drive relation.

2. A drive construction for screw conveyer apparatus comprising a drive end shaft for removable connection with the screw conveyer of such apparatus, said drive end shaft being formed with a collar for abutting the end of the conveyer, an end bearing unit having means for detachable connection with one end of the screw conveyer trough or housing and forming the end wall therefor, said unit being also formed with a bearing sleeve portion for said drive end shaft, and a gear case unit detachably connected with said first unit and comprising countershaft bearings and gearing including a gear removably mounted on said drive end shaft, and counterthrust bearings within said bearing sleeve portion in abutting relation, respectively, with said collar and the gear on said drive end shaft.

CLARENCE F. ABRAHAM.